US012773873B2

(12) United States Patent
Ballard et al.

(10) Patent No.: US 12,773,873 B2
(45) Date of Patent: Oct. 27, 2026

(54) RIM FOR AN AT LEAST PARTIALLY MUSCLE-POWERED BICYCLE

(71) Applicant: DT SWISS INC., Grand Junction, CO (US)

(72) Inventors: Jean-Paul Victor Ballard, Thalwil (CH); Andreas Henig, Biel (CH); Simon Hugentobler, Liebefeld (CH)

(73) Assignee: DT SWISS INC., Grand Junction, CO (US)

( * ) Notice: Subject to any disclaimer, the term of this patent is extended or adjusted under 35 U.S.C. 154(b) by 398 days.

(21) Appl. No.: 18/521,046

(22) Filed: Nov. 28, 2023

(65) Prior Publication Data

US 2024/0190171 A1 Jun. 13, 2024

(30) Foreign Application Priority Data

Dec. 9, 2022 (DE) ..................... 10 2022 132 808.2

(51) Int. Cl.
*B60B 21/10* (2006.01)
*B60B 1/00* (2006.01)
*B60B 21/02* (2006.01)

(52) U.S. Cl.
CPC ............ *B60B 21/104* (2013.01); *B60B 1/003* (2013.01); *B60B 21/025* (2013.01); *B60B 21/026* (2013.01); *B60B 21/106* (2013.01); *B60Y 2200/13* (2013.01)

(58) Field of Classification Search
CPC ..... B60B 21/025; B60B 21/04; B60B 21/104; B60B 21/106
See application file for complete search history.

(56) References Cited

U.S. PATENT DOCUMENTS 2,937,905 A * 5/1960 Altenburger .......... B60B 21/026
301/58
5,975,645 A 11/1999 Sargent
(Continued)

FOREIGN PATENT DOCUMENTS

WO 2016137794 A1 9/2016
WO 2019197828 A1 10/2019

OTHER PUBLICATIONS

European Search Report received for Application No. 23213730.7 dated May 21, 2024.
(Continued)

*Primary Examiner* — Jason R Bellinger
(74) *Attorney, Agent, or Firm* — Greer, Burns & Crain, Ltd

(57) ABSTRACT

A rim, having a rim body with rim flanks, a rim well and a rim base, in which the flanks abut in the radially most inwardly point, and with opposed rim flanges, each extending from one of the flanks up to a radially most outwardly point, so that the rim flanges form opposed side walls with the flanks. The widest spot of the rim body lies beneath the rim well and above a horizontal centerline. The width in the widest spot is at least one quarter larger than a clear rim width between the rim flanges. The side walls show a defined curvature shape with an inflection point which is disposed between the radially most outwardly point and the widest spot and lies external of the rim flange. In the inflection point, a concave curvature makes a transition to a convex curvature lying between the inflection point and the widest spot.

20 Claims, 5 Drawing Sheets

(56) References Cited

U.S. PATENT DOCUMENTS

| | | | |
|---|---|---|---|
| 8,757,733 | B2 * | 6/2014 | Smart .................... B60B 1/003 301/95.104 |
| 9,656,516 | B2 * | 5/2017 | Hall ........................ B60B 1/003 |
| 10,875,356 | B2 | 12/2020 | Hed et al. |
| 2006/0200989 | A1 | 9/2006 | Possarnig et al. |
| 2009/0115240 | A1 * | 5/2009 | Slate .................... B60B 21/028 301/95.104 |
| 2013/0026815 | A1 | 1/2013 | Smart |
| 2013/0113269 | A1 | 5/2013 | Katsanis |
| 2014/0130953 | A1 | 5/2014 | Chen |
| 2016/0250890 | A1 | 9/2016 | Smart |
| 2017/0008337 | A1 | 1/2017 | Hed et al. |
| 2018/0361785 | A1 | 12/2018 | Child et al. |
| 2019/0337331 | A1 * | 11/2019 | Scruggs .................. B60B 21/10 |

OTHER PUBLICATIONS

German Search Report received for Application No. 10 2022 132 808.2 dated Jul. 28, 2023.

* cited by examiner

RIM FOR AN AT LEAST PARTIALLY MUSCLE-POWERED BICYCLE

RELATED APPLICATION

The present application claims priority from German application Serial No. 10 2022 132 808.2 filed Dec. 9, 2022, the contents of which are incorporated by reference herein.

BACKGROUND

The invention relates to a rim for an at least partially muscle-powered bicycle with a rim body with opposed rim flanks, a rim well and a rim base, in which the rim flanks abut in the radially most inwardly point, and with opposed rim flanges. Each of the rim flanges extends from one of the rim flanks up to a radially most outwardly point. The rim flanges together with the rim flanks form opposed side walls, which extend from the radially most inwardly point up to the radially most outwardly point.

As a rule, racing bicycles use the narrowest tires possible to achieve low aerodynamic drag and good rolling qualities. This is why the rim width can be correspondingly narrow. However, it has been shown that rims which are somewhat wider than the tires result in advantages in terms of aerodynamics. Therefore, for example U.S. Ser. No. 10/875,356 B2 has disclosed a racing bicycle rim, the maximum width of which lies in the region of the rim flank and thus beneath the rim flanges.

However, examinations have shown that this concept brings problems with application on rims intended to be equipped with wider tires. These rims are required e.g. for gravel bikes or for racing bicycles in cross-country races (cyclo-cross bikes). The rims for these bicycles need to be equipped with wider tires to allow safe traveling also on drystone roads and unpaved roads.

The wider tires inevitably require wider rims. However, if the aerodynamic properties of the aforementioned racing bicycle rims having their widest spot beneath the rim flanges, are to be realized as well, a conflict of goals arises. On the whole, this makes the rims very heavy and so wide that they can no longer optimally interact with the racing bicycle and its aerodynamic components (frame, fork, etc.). In other words, the racing bicycle rims, which are per se tried and proven, cannot be converted to rims for cross-country races simply by scaling up.

It is therefore the object of the present invention to provide an improved rim for cross-country races which does justice to the considerations discussed above as far as possible. The rim should, in particular, have the lowest possible weight and the best possible aerodynamic properties.

SUMMARY

The rim according to the invention is provided for an at least partially muscle-powered bicycle and, in particular, for a sports bicycle for cross-country races (e.g. gravel bikes, cyclo-cross bikes). Where it is technically useful, the rim may be advantageously used with other bicycle types. The rim comprises at least one rim body with opposed rim flanks and with a rim well and a rim base. The rim flanks abut in the radially most inwardly point in the rim base. The rim base serves, in particular, for anchoring spokes. The rim body comprises opposed rim flanges, each extending from one of the rim flanks up to a radially most outwardly point. In particular, the rim flanges together with the rim flanks form opposed side walls, which extend from the radially most inwardly point up to the radially most outwardly point. The widest spot of the rim body lies beneath the rim well and above a horizontal centerline. The width in the widest spot (what is called the maximum width) is larger by at least one fourth and preferably at least one third of the clear rim width between the rim flanges. The side walls each have a (continuous) defined curvature shape with at least one (first) inflection point. The inflection point is disposed between the radially most outwardly point and the widest spot. The inflection point lies external of the rim flange. In the inflection point, a (first) concave curvature makes a transition to a (first) convex curvature. The convex curvature lies between the inflection point and the widest spot. The concave curvature lies between the inflection point and the radially most outwardly point. The result is, in particular, that the side walls between the radially most outwardly point and the inflection point have a concave curve at least in sections, and between the inflection point and the widest spot, have a convex curve, at least in sections.

The present invention offers many advantages. A considerable advantage ensues from the specific curvature shapes of the side walls. These curvature shapes can optimally solve the conflict of goals discussed above, between a lightweight, aerodynamic racing bicycle rim, and a rim for use with wider tires for cross-country races. These curvature shapes allow to overcome even large differences between the width in the region of the rim flanges and the width in the widest spot, not involving any inconvenient material accumulations or aerodynamic problem areas.

For example, the rim according to the invention can be provided with a rather narrow rim whose width is still sufficient for cross-country tires. Concurrently, the widest spot can be configured so wide that even the appropriately wide cross-country tires do not protrude beyond the widest spot. This results in a very large difference in widths between the rim width and the widest spot. The curvature shapes presented herein can optimally overcome these differences.

It is advantageous and preferred for the side walls to have a cross-sectional geometry with an S-shaped outside surface between the radially most outwardly point and the widest spot. This, particularly well, overcomes the difference in widths between the widest spot and an appropriately narrow rim width. It is possible for the side wall to have an S-shaped cross-sectional geometry overall (together with its outside and inside surfaces) between the radially most outwardly point and the widest spot. In particular, do the side walls each have the same (mirror-inverted) curvature shapes. In particular, do the side walls have the same (mirror-inverted) cross-sectional geometry. The side walls are, in particular, configured similarly.

Preferably, the widest spot is closer to the rim flange than to the horizontal centerline. In particular, is the widest spot closer to the rim well than to the horizontal centerline.

The widest spot is, in particular, at least at 60% and preferably at least 65% of the height of the rim body. The widest spot is, in particular, at least at 65% of the height +/−3 mm. Particularly preferably, the widest spot is at 70%+/−2 mm and, in particular, at 70% of the height. This positioning of the widest spot has advantageous aerodynamic effects. For example, the widest spot lies at a height of 35 mm if the rim body has a total height of 50 mm.

The maximum width is in particular at least 1.4 times and preferably at least 1.5 times the clear rim width. The clear rim width is, in particular, maximally two thirds of the maximum width. The maximum width is, in particular, at least 32 mm, and preferably at least 34 mm, and particularly preferably, at least 36 mm. The maximum width is, in particular, 36 mm+/−2 mm and, in particular 36+/−1 mm. For example, the maximum width is 36.5 mm, given a clear rim width of 24 mm. This results in considerable aerodynamic advantages, even when using the appropriately wide tires for cross-country races.

The clear rim width is, in particular, less than 32 mm and preferably less than 28 mm and, in particular, less than 26 mm. In particular, is the clear rim width more than 18 mm and preferably more than 22 mm. Particularly preferably, the clear rim width is 24 mm+/−2 mm and, in particular, 24+/−1 mm. For example, the clear rim width is 24 mm. These rim widths allow on the one hand, using wider tires, while concurrently allowing a lightweight and streamlined construction of the rim in the region of the rim flanges. The curvature shapes advantageously overcome the difference in widths thus required.

It is preferred for the maximum width to be larger than the clear rim width by at least 8 mm and preferably at least 10 mm. Particularly preferably, the maximum width is at least 12 mm larger than the clear rim width.

The concave curvature preferably runs from the inflection point continuously up to the rim flange. The concave curvature terminates, in particular, on the rim flange, at a distance from the radially most outwardly point. The concave curvature runs, in particular, only on a part section of the rim flange. The part section is, in particular, spaced apart from the radially most outwardly point. The concave curvature ends, in particular, on another inflection point on the rim flange (as it will, in particular, be described below). The concave curvature runs, in particular, both above the rim well and beneath the rim well on the rim flange. The concave curvature is, in particular, closer to the rim flange than is the convex curvature.

The convex curvature runs, in particular, from the inflection point continuously up to the widest spot. The convex curvature, in particular, runs only on the rim flank and not on the rim flange. It is possible for another convex curvature to be configured on the rim flange (in particular, as described below). The convex curvature runs, in particular, only beneath the rim well. In other words, the convex curvature lies deeper than the rim well (relative to the height of the rim body). In particular, is the convex curvature closer to the widest spot than is the concave curvature.

It is preferred and advantageous for the width of the rim body to increase (on the whole) including along the concave curvature. Thus, the side wall can be narrow and optimized in weight. Concurrently, the concave curvature is a factor in enabling a maximum width which in comparison to the rim width is very large and also very far radially outwardly.

In an advantageous configuration it is provided for at least 65% and, in particular, at least 70%, and preferably at least 75% (or three quarters) of the increase in width along the total of the concave curvature and the convex curvature, to be achieved over maximally 25% (or one quarter) of the height of the rim body and concurrently outside of the rim flange and/or beneath the rim well. The width increase defined above takes place, in particular, over maximally 22% and particularly preferably maximally 20% of the height of the rim body. In other words, nearly the entire increase in width along the concave and convex curvatures takes place over a very small difference in height (or short length) outside of the rim flange.

For example, the width increases along the concave and convex curvatures by a total of at least 6 mm (the increase of both side walls in total). The width increases outside of the rim flange and beneath the rim well for example at least 4.5 mm. This increase of 4.5 mm extends for example over a height of maximally a quarter (e.g. 9 mm) of the total height of the rim body (e.g. 50 mm).

The convex curvature, preferably has a minimum radius which is smaller than the minimum radius of the concave curvature. The minimum radius showing between the widest spot and the inflection point, is, in particular, smaller than the minimum radius showing between the inflection point and the end of the concave curvature respectively the further inflection point. The minimum radius, in particular, corresponds to the maximum curvature. Preferably, the maximum curvature of the convex curvature is larger than the maximum curvature of the concave curvature.

The minimum radius of the concave curvature, in particular, lies on the rim flange and/or above the rim well. The minimum radius of the convex curvature is, in particular, closer to the widest spot than to the inflection point. It is also possible for the minimum radius of the convex curvature to lie in the widest spot.

The concave curvature, in particular, consists of a rim flange curvature section and of a rim flank curvature section. The rim flange curvature section runs, in particular, along the rim flange. The rim flank curvature section runs, in particular, along the rim flank. It is preferred and advantageous for the width of the rim body to increase less along the rim flange curvature section than it does along the rim flank curvature section. Thus, a small rim width and large maximum width notwithstanding, an inconvenient material accumulation on the rim flange and in the region of the rim flange is reliably avoided. The rim flange curvature section, in particular, runs from the beginning of the rim flange up to the further inflection point.

The width of the rim body along the rim flank curvature section, in particular, increases at least by a factor of 1.2, and preferably at least by a factor of 1.3, and particularly preferably at least by a factor of 1.4, compared to the increase along the rim flange curvature section. This accommodates the width increase optimized in weight and concurrently with a static support. In particular, does the width of the rim body increase along the rim flange curvature section by at least 0.55 mm, and preferably by at least 0.60 mm, and particularly preferably at least 0.65 mm (per side wall). The width of the rim body, in particular, increases along the rim flank curvature section by at least 0.90 mm and preferably by at least 0.95 mm and particularly preferably by at least 1.0 mm (per side wall).

The width of the rim body, in particular, increases by a first width along the rim flank curvature section and the convex curvature (on the whole). The width of the rim body, in particular, increases by a second width along the rim flange curvature section (on the whole). It is preferred for the first width increase to be at least twice and preferably at least three times, and particularly preferably at least 3.2 times the second width increase. The second width increase is, in particular, configured such as has been described above for the increase of the width along the rim flank curvature section. The first width increase is, in particular, at least 1.90 mm and preferably at least 2.10 mm and particularly preferably at least 2.25 mm (per side wall).

It is possible and advantageous for the total increase of the width to deviate along the concave curvature by maximally 20%, and preferably maximally 10%, and particularly preferably maximally 5%, from the increase in width along the convex curvature. In other words, the concave and convex curvatures, in particular, have very similar width increases. It is a significant advantage of the invention that the width increase at the rim flange constitutes only an appropriately minor part in the width increase along the concave curvature.

The concave curvature and the convex curvature preferably each show a radius whose value varies over the length of the curvature shape. The concave curvature and/or the convex curvature, in particular, have a variable radius.

In an advantageous specific embodiment, another (a second) inflection point is disposed on the rim flange. The further inflection point, in particular, lies between the (first) inflection point and the radially most outwardly point. The further inflection point, in particular, provides for a transition from the (first) concave curvature to another (a second) convex curvature. The concave curvature, in particular, runs from the inflection point up to the further inflection point. The further convex curvature, in particular, extends in the direction to the most outwardly point. The further convex curvature, in particular, has a constant radius.

It is possible and advantageous for the further convex curvature to extend up to a section which is configured straight (absent a curvature). The straight section, in particular, extends up to, or terminates just in front of, the radially most outwardly point. The straight section, in particular, runs at an angle between 0° and 5° and preferably between 1° and 3°. For example, an angle of 2° to the horizontal centerline is provided. The straight section, in particular, rises in the direction to the radially most outwardly point. It is also possible for the further convex curvature to extend at least up to the radially most outwardly point.

Preferably, the further inflection point lies beneath the closest place between the rim flanges. The closest place is, in particular, where the (smallest) clear rim width is. Preferably, the further inflection point, showing a maximal deviation of 10% and preferably 8%, and/or +/−1 mm, is in the same position as is the closest place between the rim flanges. It is possible for the further inflection point to lie in the same height position as does the closest place.

It is preferred and advantageous for at least 70% and preferably at least 75% (three quarters) of the width increase between the further inflection point and the widest spot of the rim body on the whole, to be achieved external of the rim flange and/or beneath the rim well. In particular, maximally 30% and preferably maximally 25% (or one quarter) of the width increase between the further inflection point and the widest spot of the rim body on the whole, occurs along the rim flange and/or above the rim well.

In particular, does the width of the rim body decrease from the further inflection point up to the radially most outwardly point. In particular, does the width of the rim body increase beneath the further inflection point up to the widest spot.

An advantageous specific embodiment provides for a tangent (outwardly) adjacent to the rim flange in the further inflection point, has an angle of at least 82° and preferably at least 84° to the horizontal centerline. The tangent, in particular, shows an angle of maximally 90° to the horizontal centerline. This enables an appropriately slim and streamlined configuration of the rim in the region of the rim flanges. Moreover, the rim body can be given a particularly lightweight final shape combined with gentle handling in removing from a shaping tool.

In particular, is the tangent inclined toward the vertical axis of the rim body, by maximally 8° and preferably maximally 6°. The tangent, in particular, has an angle of at least 0° to the vertical axis of the rim body. In particular, is the tangent not inclined to the vertical axis of the rim body at a negative angle.

It is possible for the inside surface of the rim flange to be inclined at an angle of at least 85°, and preferably at least 87°, to the horizontal centerline. The inside surface is, in particular, disposed at a maximal angle of 90° to the horizontal centerline. Preferably, the angular difference between the tangent and the inner wall is maximally 5°, and preferably maximally 3°+/−1°, and, in particular, 3°. This again aids with gentle handling in demolding.

In all the configurations it is preferred for the rim body to be free of brake flanks and/or other friction surfaces configured for braking. In particular, the side walls are configured without any brake flanks. Both the rim flanks and the rim flanges are, in particular, configured without any brake flanks. The rim is, in particular, provided for use on a wheel with disk brakes.

The rim body is, in particular, manufactured from a plastic, and preferably from a fibrous composite material. For example, a carbon fiber reinforced plastic (CFRP, CRP, or "Carbon") is provided. Other suitable plastics are likewise conceivable.

In the scope of the present invention, the particulars on the curvature and other dimensions of the side wall, in particular, relate to the outside surface thereof. Any particulars relating to the rim flank and the rim flange, in particular, refer to the respective outside surfaces, unless specified otherwise. The concave and convex curvatures and the further concave curvature are each configured continuously. The reciprocal value of the radius in a defined spot of the curvature shape corresponds, in particular, to the curvature in the defined spot. Particulars on the radius refer, in particular, to its value.

The widest spot, in particular, does not have any G2 smoothness. The widest spot, in particular, has a maximum G1 smoothness (so-called tangent smoothness). The convex curvature, in particular, makes a transition (in particular, in the widest spot) to a further curvature shape, which extends in the direction of the rim base. The convex curvature, in particular, makes a transition to the further curvature shape at a maximum G1 smoothness. The convex curvature, in particular, makes no transition to the further curvature shape at a G2 smoothness. The curvature shape and preferably the side walls, in particular, have transitions which do not meet a G2 smoothness (nor any higher smoothness). The curvature shape and preferably the side walls, in particular, do not have a continuous G2 smoothness (nor any higher smoothness).

The height, in particular, relates to the distance from the radially most inwardly point to the radially most outwardly point in the direction of the vertical respectively radial axis. The height runs, in particular, transverse to the width or transverse to the horizontal centerline. The horizontal centerline, in particular, divides the rim body in two equally high parts. The clear rim width in particular, corresponds to the clear width respectively the, clearance measure between the rim flanges. The rim width is, in particular, measured where the closest spot between the rim flanges lies. The clear rim width may also be denoted the inner rim width.

The rim flange begins, in particular, where a horizontal plane of the rim well intersects the side wall. The plane lies, in particular, horizontally on the rim well, intersecting the side wall where the rim flange and the rim flank abut. The plane is, in particular, an imaginary, horizontal plane, extending through the one or more of the highest points of the rim well, which show beneath the closest spot between the rim flanges. The plane is, in particular, where the specific rim diameter is measured according to ISO/ETRTO. Therefore, the plane may be referred to as the radially outwardly boundary of the diameter according to ISO/ETRTO. The rim flange, in particular, begins at the specific rim diameter according to ISO/ETRTO, from where it extends radially outwardly. The plane, in particular, corresponds to the supporting surface for the tires according to ISO/ETRTO for bicycle rims.

This plane, in particular, corresponds to a plane (non-curved) section on the top face of the rim well. The plane does not need to correspond to the actual top face of the rim well. However, it may correspond to the actual top face of the rim well. The plane may, in particular, lie above a curved or inclined rim well. The plane extends, in particular, horizontal. The plane is, in particular, defined in that it runs through the spot of the rim well representing the highest elevation that can be measured beneath the clear rim width. Part of the rim well may lie beneath or above such a plane (e.g. in the shape of a concave depression or an upwardly curvature).

Further advantages and features of the present invention can be taken from the exemplary embodiments which will be discussed below with reference to the enclosed figures.

DETAILED DESCRIPTION

Figure 1:
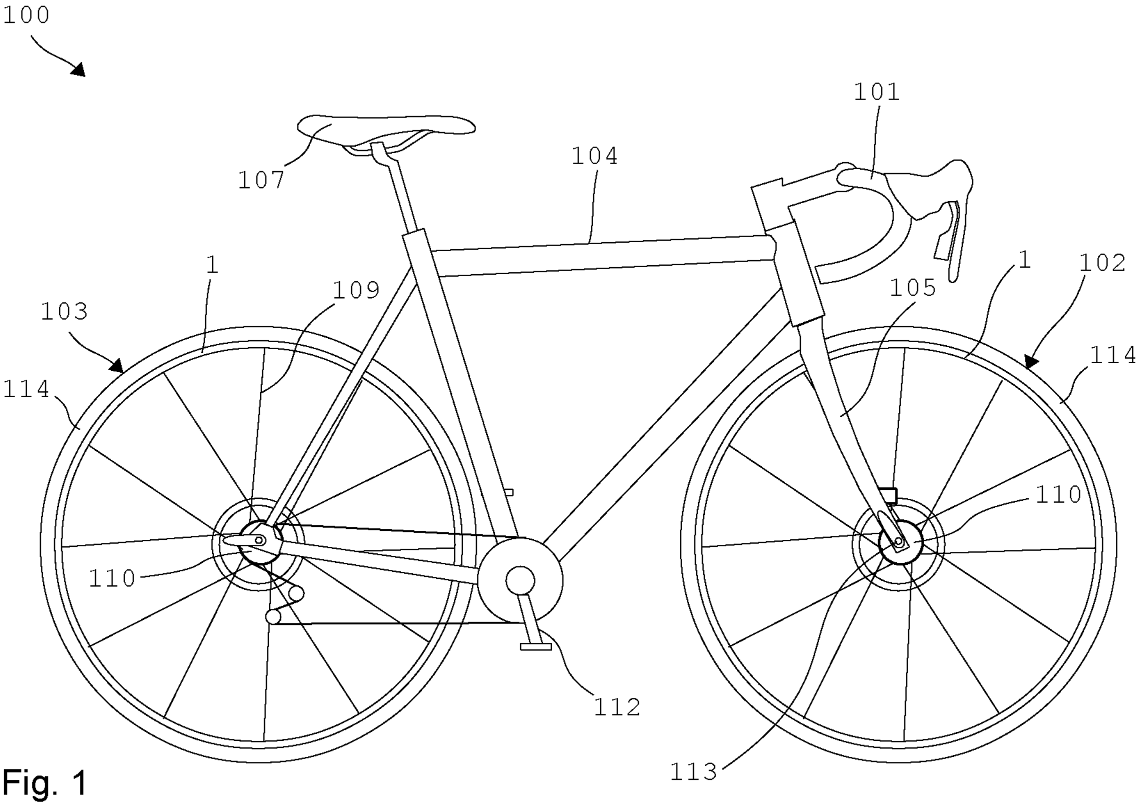
FIG. 1 a schematic illustration of a bicycle with rims according to the application.

FIG. 1 shows an at least partially muscle-powered bicycle 100, which is presently configured as a sports bicycle for cross-country races and e.g. as a gravel bike or a cyclo-cross bicycle. The bicycle 100 has a front wheel 102 and a rear wheel 103 having one rim 1 each according to the application. The two wheels 102, 103 are provided with spokes 109 for connecting the rim 1 with the hubs 110. To this end, the rim 1 is provided e.g. with spoke holes. To allow fast and safe riding also on drystone and unpaved roads, the rims 1 are equipped with tires 114, whose width is e.g. 30 mm to 50 mm.

The bicycle 100 comprises a frame 104, a handlebar 101 with grips, a saddle 107, a fork or suspension fork 105. For cross-country races in particularly difficult terrain, a rear wheel damper, not shown, may be provided. A pedal crank 112 with pedals serves for driving. Optionally, the pedal crank 112 and/or the wheels 102, 103 may be provided with an electrical auxiliary drive. The hubs of the wheels 102, 103 may each be fastened to the frame 104 or the fork 105 by means of a clamping system 113 (such as a through axle or a quick release).

Figure 2:
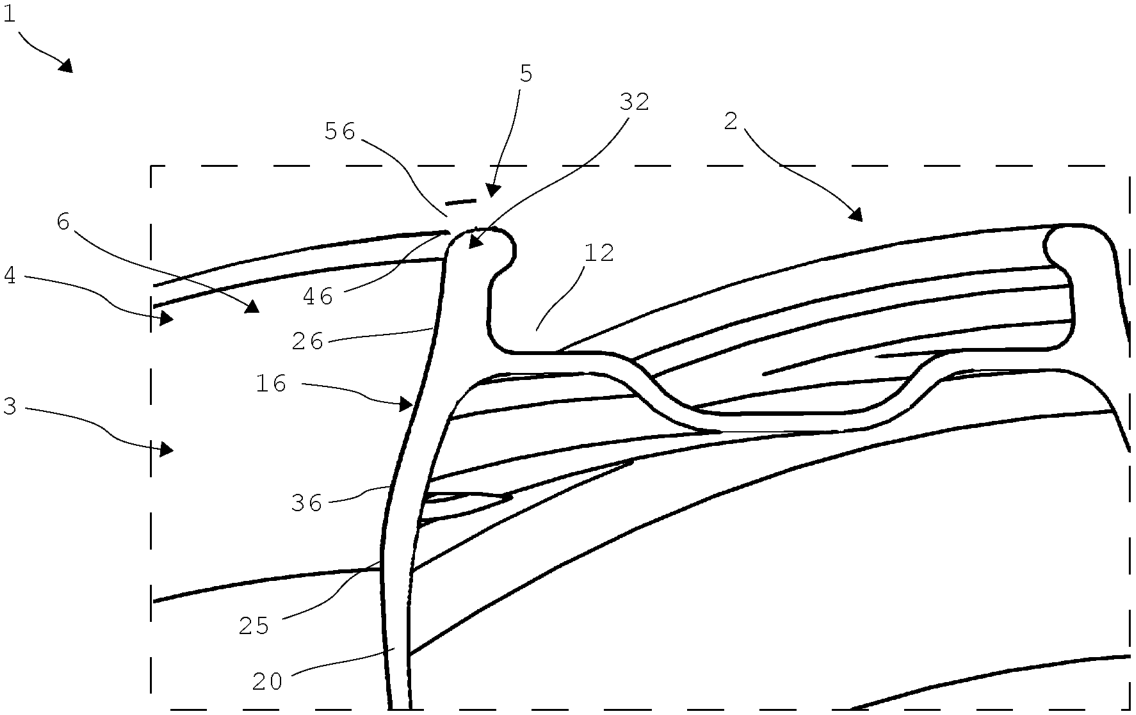
FIG. 2 a schematic illustration of a rim according to the application in a perspective, cross sectional view.
Figure 3:
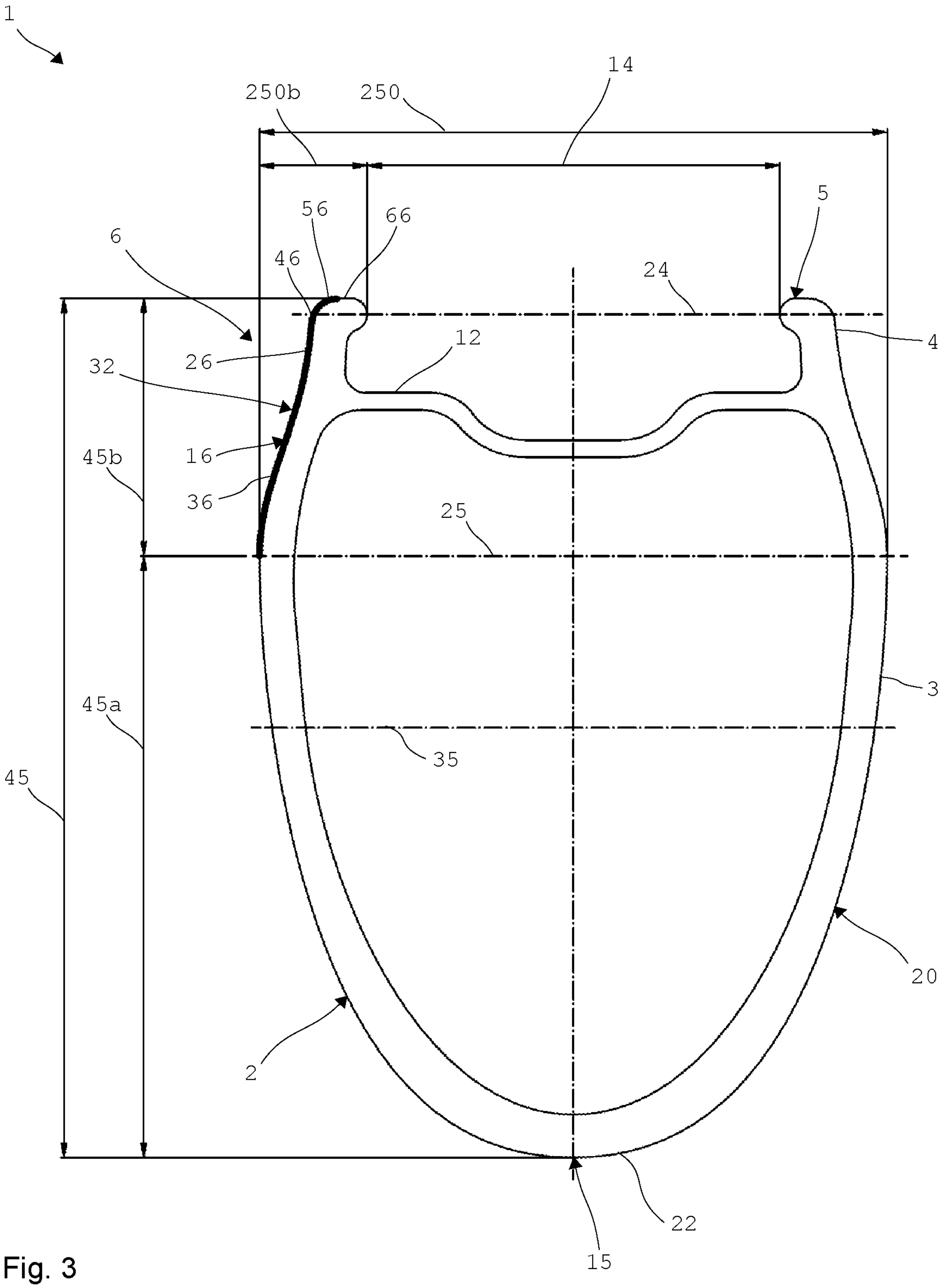
FIG. 3 a schematic illustration of a rim according to the application in a cross sectional view.

The rim 1 employed in the bicycle 100 will now be described with reference to the FIGS. 2 and 3. The rim 1 comprises a rim body 2, which comprises opposed rim flanks 3, a rim well 12 and a rim base 22, and opposed rim flanges 4. Supplementarily to the rim body 2, the rim 1 may comprise further components, for example sealants for the use of tubeless tires. The rim body 2 shown is equipped without any brake flanks.

The rim flanks 2 abut in a radially most inwardly point 15, extending from there to the rim flanges 4. The rim flanges 4 start from the rim flanks 3, extending up to a radially most outwardly point 5. This results in opposed side walls 20, extending from the radially most inwardly point 15 up to the radially most outwardly point 5. The rim flange 4 begins where a horizontal plane of the rim well 12 intersects the side wall 20. In the example shown, the reference numeral 12 points toward this plane. This plane also corresponds to the supporting surface of the tire and serves to determine the size of the rim 1 according to ETRTO.

The rim base 22 may show recesses where spokes 109 respectively nipples can be attached. The rim well 12 may comprise openings through which to access the spokes 109 respectively nipples for installation and servicing.

The clear rim width 14 between the rim flanges 4 shown is dimensioned such that the usual tire widths in cross-country races can be safely operated on the rim 1. Particularly preferably, for example tires between 30 mm and 40 mm can be employed. For aerodynamic optimization of the rim 1 or the combination of the rim 1 with cross-country tires, the clear rim width 14 chosen is the narrowest possible and is for example 24 mm. The clear rim width 14 is measured in the narrowest spot 24 between the rim flanges 4.

In order to offer the best possible aerodynamic properties, the widest spot 25 of the rim body 2 lies beneath the rim well 12 and above a horizontal centerline 35. It has been shown to be of particular advantage for the widest spot 25 to lie at least at 65% of the height 45 of the rim body 2. For example, the height 45 shown is 50 mm, and the widest spot 25 lies at a height 45*a* of 35 mm. Then the difference 45*b* is 15 mm. In this example, the widest spot 25 then lies at 70% of the height 45 of the rim body 2.

For the rim 1 to provide optimal aerodynamics including in combination with the appropriately wide cross-country tires, the width 250 in the widest spot 25 is at least one quarter larger than is the clear rim width 14. For example a width 250 of 36.5 mm is advantageous. This is why the maximum width 250 is 12.5 mm larger than the clear rim width 14. Thus, the rim 1 can be equipped with a wide range of cross-country tires, without risking that the widest spot 25 is too narrow compared to the tire. This ensures that even cross-country tires do not laterally protrude beyond the widest spot 25.

However, the dimensioning described above results in the problem that the difference 250*b* must be overcome across a very small portion of the height 45 (for example, difference 45*b*=15 mm). To avoid material accumulations or aerodynamic problem areas, the side walls 20 are provided with special curvature shapes 6. The curvature shape 6 of the pertaining side wall 20 has an inflection point 16 in which a concave curvature 26 makes a transition to a convex curvature 36. The curvature shapes 6 provide the side walls 20 with a cross-sectional geometry 32 having an S-shaped outside surface.

The concave curvature 26 runs from the inflection point 16 up to a further inflection point 46 on the rim flange 4. A further convex curvature 56 follows, from the further inflection point 46 in the direction to the radially most outwardly point 5. At its top end, the further convex curvature 56 makes a transition to a straight section 66, which extends up to the radially most outwardly point 5. The curvature shape 6 as well as the further convex curvature 56 are illustrated in the FIG. 3 on the left side wall 20 by an enlarged line width. The curvature shape 6 with its special cross-sectional geometry 32 extends from the further inflection point 46 downwardly to the widest spot 25.

Figure 4:
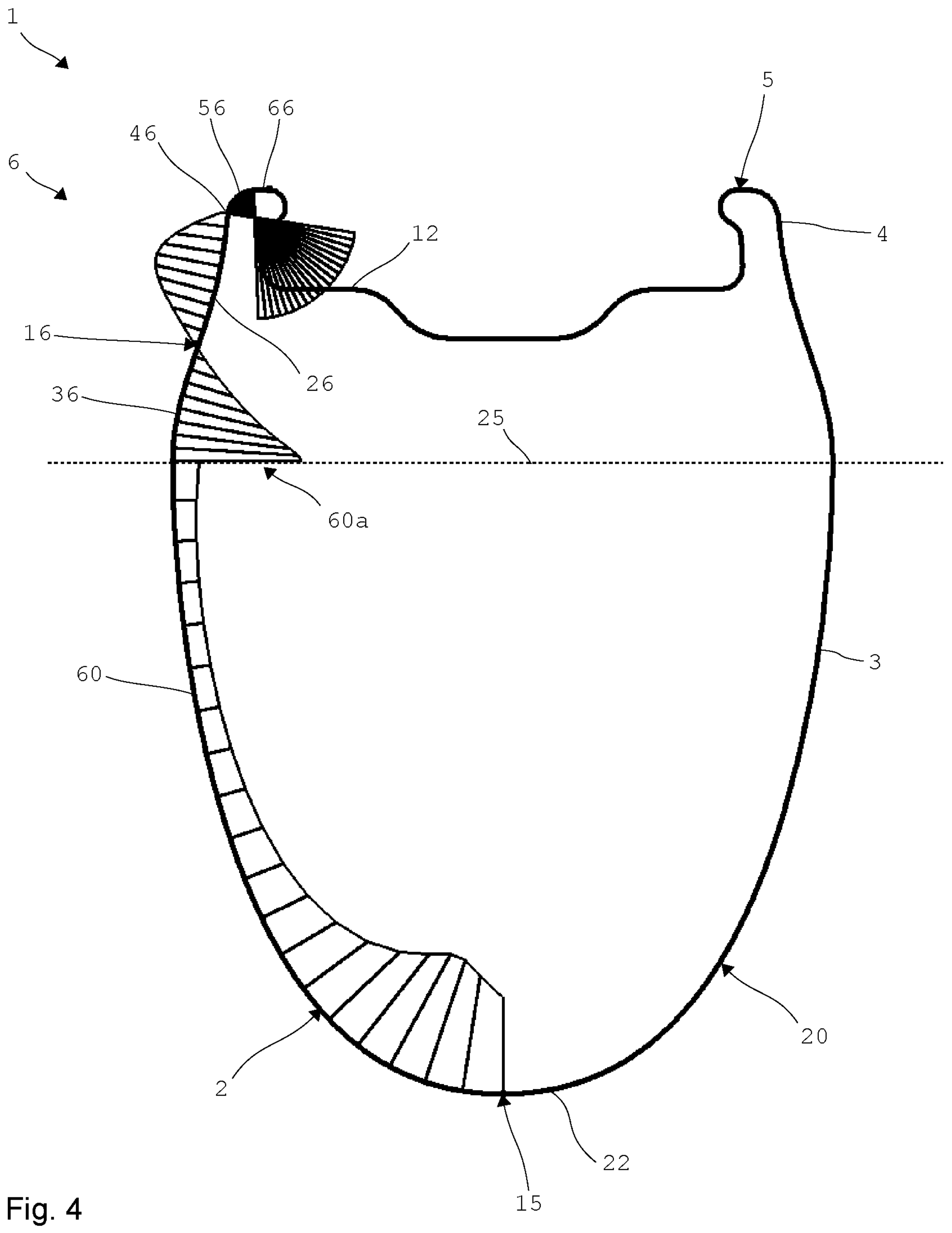
FIG. 4 the rim according to FIG. 3 with a curvature ridge.
Figure 5:
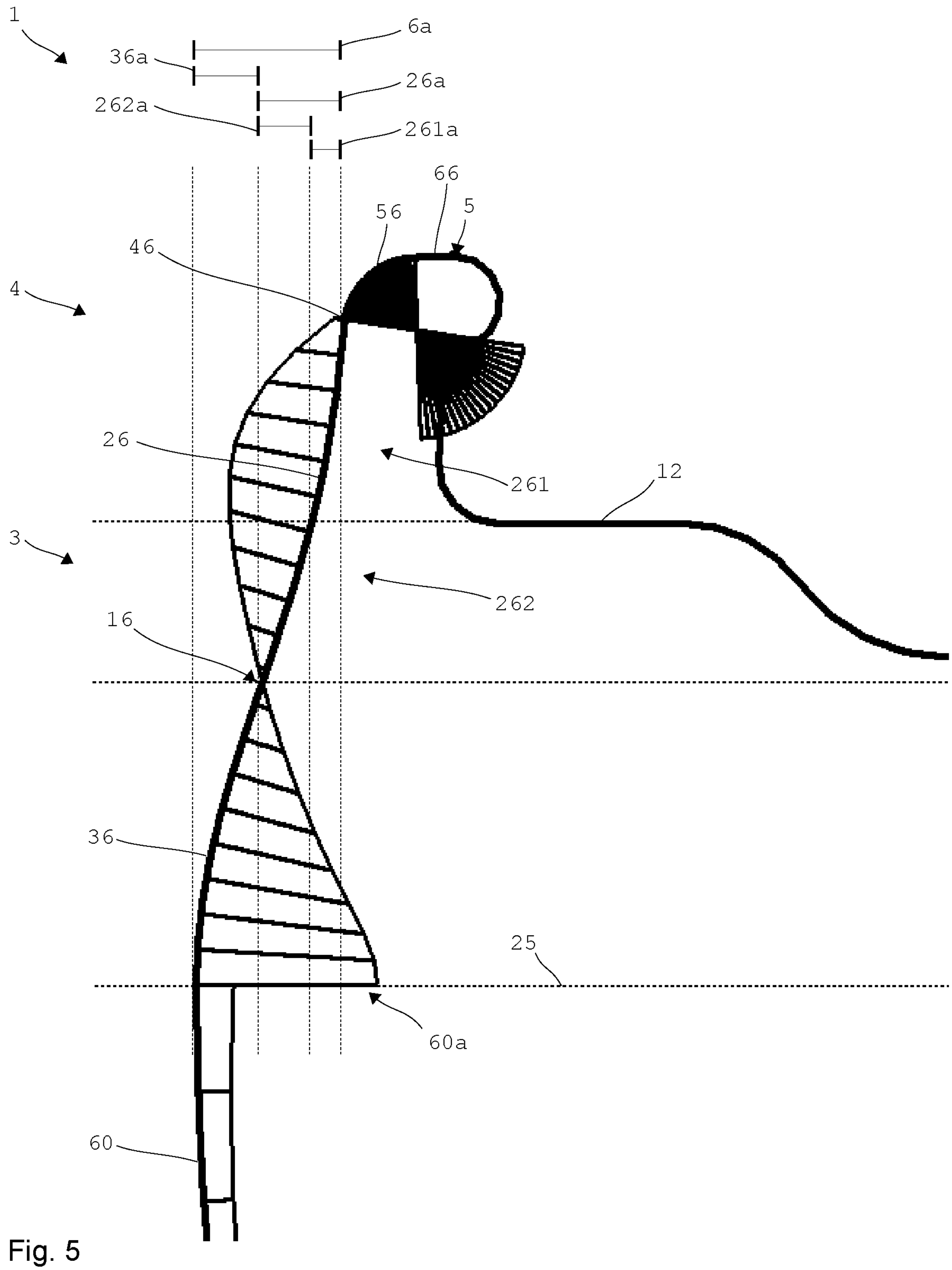
FIG. 5 a schematic detail illustration of the rim in FIG. 4.

The FIGS. 4 and 5 show an exemplary rim 1 to illustrate the curvature shape 6. To this end, a so-called curvature ridge is inserted in the FIG. 4 along the left side wall 20. The curvature ridge shows a plurality of rays which by their length represent the curvature at the starting point of the ray. The longer the rays, the larger the curvature. Since the curvature corresponds to the reciprocal value of the pertaining radius, the radius is smaller the longer the rays are. To enhance comprehensibility, FIG. 5 shows the rays of the curvature ridge proportionally shorter compared to FIG. 4.

The curvature ridge enables clear recognition of which positions are located the inflection point 16, the concave curvature 26 and the convex curvature 36, and the further inflection point 46, and the further convex curvature 56. One can also clearly see that the further convex curvature 56 shows a continuous radius. For example, the radius is 1.5 mm.

The curvatures 26, 36, however, show a variable radius. For example, the concave curvature 26 has a maximal curvature with a radius of 22 mm+/−10%. For example, the convex curvature 36 has a maximal curvature with a radius of 11 mm+/−10%. In other words, the convex curvature 36 has a minimal radius which is smaller than the minimal radius of the concave curvature 26.

Moreover, one can clearly recognize the geometric smoothness of the transition from the convex curvature 36 to the further curvature shape 60 lying beneath, of the side wall 20. The jump 60*a* in the curvature ridge indicates a G1 smoothness respectively a tangent smoothness. In the region of the transition to the convex curvature 36, the further curvature shape 60 has e.g. a maximal curvature with a radius of 59 mm+/−10%.

This concave curvature 26 consists of a rim flange curvature section 261 and a rim flank curvature section 262 (see FIG. 5). The rim flange curvature section 261 extends from the further inflection point 46 along the rim flange 4 up to the rim well 12 respectively its horizontal plane (shown in broken lines). This is where the rim flank curvature section 262 begins, extending up to the inflection point 16.

FIG. 5 shows broken, vertical lines, illustrating the width increase along the individual sections of the curvature shape 6. What is shown is, the increase 6*a* of the width along the concave curvature 26 and the convex curvature 36 (thus along the entire curvature shape 6 from the further inflection point 46 as far as the widest spot 25). Also shown are: the increase 26*a* in width along the concave curvature 26, the increase 36*a* in width along the convex curvature 36, the increase 261*a* in width along the rim flange curvature section 261, the increase 262*a* in width along the rim flank curvature section 262.

In an exemplary configuration of the rim 1 (preferably the rim 1 described above) the increase 6*a* is 3.055 mm. Thereof, the increase 36*a* is 1.353 mm, and the increase 26*a* is 1.702 mm. The increase 26*a* includes the increase 262*a* at 1.017 mm and the increase 261 A, as little as 0.68 mm. Thus, the width increases only very little along the rim flange curvature section 261. The width then increases very rapidly in the rim flank curvature section beneath, and along the convex curvature 36. The width increase along the rim flank curvature section 262 and the convex curvature 36 is more than three times the width increase along the rim flange curvature section 261.

Thus, more than 70% of the increase 6*a* of the width, on the whole taking place between the further inflection point 46 and the widest spot 25, is achieved external of the rim flange 4. The increase 6*a* of the width in the example shown takes place over a height difference of as little as 13.7 mm. Of this height difference, 9.5 mm lie beneath the rim well 12 and external of the rim flange 4. Given a total height 45 of the rim body 2 of 50 mm, the height difference of 9.5 mm provides a portion of 19%. Thus, more than 70% of the increase 6*a* in width along the concave curvature 26 and the convex curvature 36 are achieved over as little as 19% of the height 45 of the rim body 2 and at the same time external of the rim flange 4.

Figure 6:
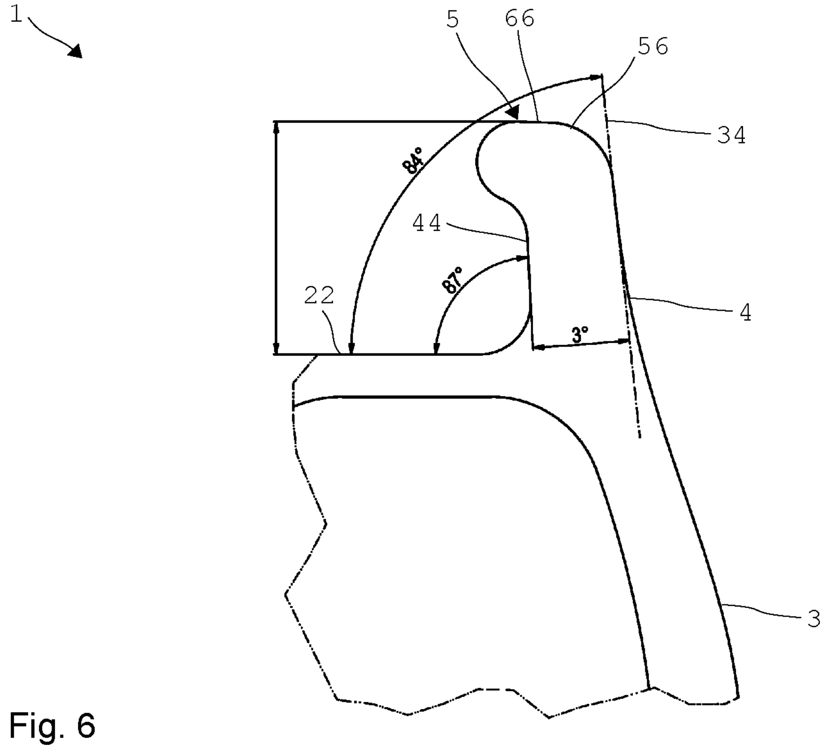
FIG. 6 a schematic detail illustration of a rim according to the application in a cross sectional view.

FIG. 6 shows an exemplary embodiment of the rim 1, where the rim flanges 4 are inclined at a defined angle. A tangent 34 adjacent to the further inflection point 46 e.g. shows an angle of 84° to the (not visible) horizontal centerline 35. Moreover, an inside surface 44 of the rim flange 4 is inclined at an angle of 87° to the horizontal centerline 35. This results in a setting angle for the rim flange 4 on its outside surface of 6° and on its inside surface 44, of 3° to the vertical axis.

These setting angles enhance the demolding process in manufacturing the rim 1, which is manufactured for example from a fibrous composite material in a suitable shaping tool. Again, the curvature shape 6 offers considerable advantages for the steep setting angle to not lead to a conflict of goals with the widest spot 25 which is to lie the closest possible to the rim flanges 4. The invention presently represented overcomes the large difference 250*b* over a very minor portion of the height 45, without requiring the rim flanges 4 to be configured inclined or with a large wall thickness.

While a particular embodiment of the present rim for an at least partially muscle-powered bicycle have been described herein, it will be appreciated by those skilled in the art that changes and modifications may be made thereto without departing from the invention in its broader aspects and as set forth in the following claims.

| List of reference numerals: | |
|---|---|
| 1 | rim |
| 2 | rim body |
| 3 | rim flank |
| 4 | rim flange |
| 5 | most outwardly point |
| 6 | curvature shape |
| 6a | increase |
| 12 | rim well |
| 14 | rim width |
| 15 | most inwardly point |
| 16 | inflection point |
| 20 | sidewall |
| 22 | rim base |
| 24 | closest spot |
| 25 | widest spot |
| 26 | concave curvature |
| 26a | increase |
| 32 | cross-sectional geometry |
| 34 | tangent |
| 35 | centerline |
| 36 | convex curvature |
| 36a | increase |
| 44 | inside surface |
| 45 | height |
| 45a | height |
| 45b | difference |
| 46 | inflection point |
| 56 | convex curvature |
| 60 | curvature shape |
| 60a | jump |

-continued

| List of reference numerals: | |
|---|---|
| 66 | straight section |
| 100 | bicycle |
| 101 | handlebar, handle |
| 102 | wheel, front wheel |
| 103 | wheel, rear wheel |
| 104 | frame |
| 105 | fork, suspension fork |
| 107 | saddle |
| 109 | spoke |
| 112 | pedal crank |
| 113 | clamping system |
| 114 | tire |
| 250 | width |
| 250b | difference |
| 261 | rim flange curvature section |
| 261a | increase |
| 262 | rim flank curvature section |
| 262a | increase |

The invention claimed is:

1. A rim for an at least partially muscle-powered bicycle, comprising: a rim body with opposed rim flanks; a rim well and a rim base, in which the rim flanks abut in the radially most inwardly point, and with opposed rim flanges, each extending from one of the rim flanks up to a radially most outwardly point, so that the rim flanges together with the rim flanks form opposed side walls, which extend from the radially most inwardly point up to the radially most outwardly point; wherein a widest spot of the rim body lies beneath the rim well and above a horizontal centerline;

in the widest spot, the width is at least one quarter larger than is a clear rim width between the rim flanges, and that the side walls each show a defined curvature shape with at least one inflection point, which is disposed between the radially most outwardly point and the widest spot and lies external of the rim flange; and in the inflection point, a concave curvature makes a transition to a convex curvature; and the convex curvature lies between the inflection point and the widest spot, and the concave curvature lies between the inflection point and the radially most outwardly point.

2. The rim according to claim 1, wherein the side walls each comprise a cross-sectional geometry with an S-shaped outside surface between the radially most outwardly point and the widest spot.

3. The rim according to claim 1, wherein the widest spot is closer to the rim flange than to the horizontal centerline.

4. The rim according to claim 1, wherein the maximum width is at least 1.4 times the clear rim width.

5. The rim according to claim 1, wherein the clear rim width is less than 32 mm, and wherein the maximum width is at least 8 mm larger than the clear rim width.

6. The rim according to claim 1, wherein the concave curvature runs from the inflection point continuously up to the rim flange and terminates on the rim flange at a distance from the radially most outwardly point.

7. The rim according to claim 1, wherein the width of the rim body also increases along the convex curvature.

8. The rim according to claim 1, wherein at least 70% of the width increase, which takes place along the convex curvature, is achieved over maximally 25% of the height of the rim body and external of the rim flange.

9. The rim according to claim 1, wherein the convex curvature has a minimal radius, which is smaller than the minimal radius of the concave curvature, and wherein the minimal radius of the concave curvature lies on the rim flange.

10. The rim according to claim 1, wherein the concave curvature consists of a rim flange curvature section running along the rim flange, and of a rim flank curvature section running along the rim flank, and wherein the width of the rim body increases less along the rim flange curvature section than along the rim flank curvature section.

11. The rim according to claim 10, wherein the width of the rim body increases more along the rim flank curvature section at least by the factor of 1.2 than the width of the rim body does along the rim flange curvature section.

12. The rim according to claim 10, wherein the width of the rim body increases by a first width along the rim flank curvature section and the convex curvature, and wherein the width of the rim body increases by a second width along the rim flange curvature section, and wherein the first width increase is at least twice the second width increase.

13. The rim according to claim 1, wherein the total width increase deviates along the concave curvature by maximally 10% from the total width increase along the convex curvature.

14. The rim according to claim 1, wherein the concave curvature and the convex curvature each show a radius whose value varies over the length of the curvature shape.

15. The rim according to claim 1, wherein a further inflection point is disposed on the rim flange, and wherein the further inflection point lies between the inflection point and the radially most outwardly point, and wherein in the further inflection point, the concave curvature makes a transition to a further convex curvature which extends at least up to the radially most outwardly point.

16. The rim according to claim 15, wherein at least 70% of the width increase taking place between the further inflection point and the widest spot of the rim body, is achieved external of the rim flange, and wherein the width of the rim body decreases from the further inflection point up to the radially most outwardly point.

17. The rim according to claim 15, wherein a tangent adjacent to the further inflection point at the rim flange shows an angle of at least 82° to the horizontal centerline.

18. The rim according to claim 1, wherein an inside surface of the rim flange is inclined to the horizontal centerline at an angle of at least 85°.

19. The rim according to claim 1, wherein the rim body is free of brake flanks.

20. The rim according to claim 1, wherein the rim body is manufactured of a plastic.

* * * * *